(No Model.)

5 Sheets—Sheet 1.

J. C. CONROY & H. D. KILGORE.
BRICK MACHINE.

No. 261,911.  Patented Aug. 1, 1882.

WITNESSES  
Fred. G. Dieterich.  
P. C. Dieterich.

By their Attorney  
J. J. Johnston

INVENTOR  
James C. Conroy  
Henry D. Kilgore

N. PETERS, Photo-Lithographer, Washington, D. C.

(No Model.) 5 Sheets—Sheet 2.

J. C. CONROY & H. D. KILGORE.
BRICK MACHINE.

No. 261,911. Patented Aug. 1, 1882.

WITNESSES
INVENTOR
By their Attorney (No Model.)  
5 Sheets—Sheet 3.

J. C. CONROY & H. D. KILGORE.
BRICK MACHINE.

No. 261,911. Patented Aug. 1, 1882.

WITNESSES  
Fred. G. Dieterich  
P. C. Dieterich

By their Attorney  
J. J. Johnston

INVENTOR  
James C. Conroy  
Henry D. Kilgore (No Model.)  
5 Sheets—Sheet 4.

J. C. CONROY & H. D. KILGORE.
BRICK MACHINE.

No. 261,911. Patented Aug. 1, 1882.

WITNESSES  
Fred. G. Dieterich.  
P. E. Dieterich.

By their Attorney  
J. J. Johnston

INVENTOR  
James C. Conroy  
Henry D. Kilgore.

(No Model.) 5 Sheets—Sheet 5.
J. C. CONROY & H. D. KILGORE.
BRICK MACHINE.
No. 261,911. Patented Aug. 1, 1882.
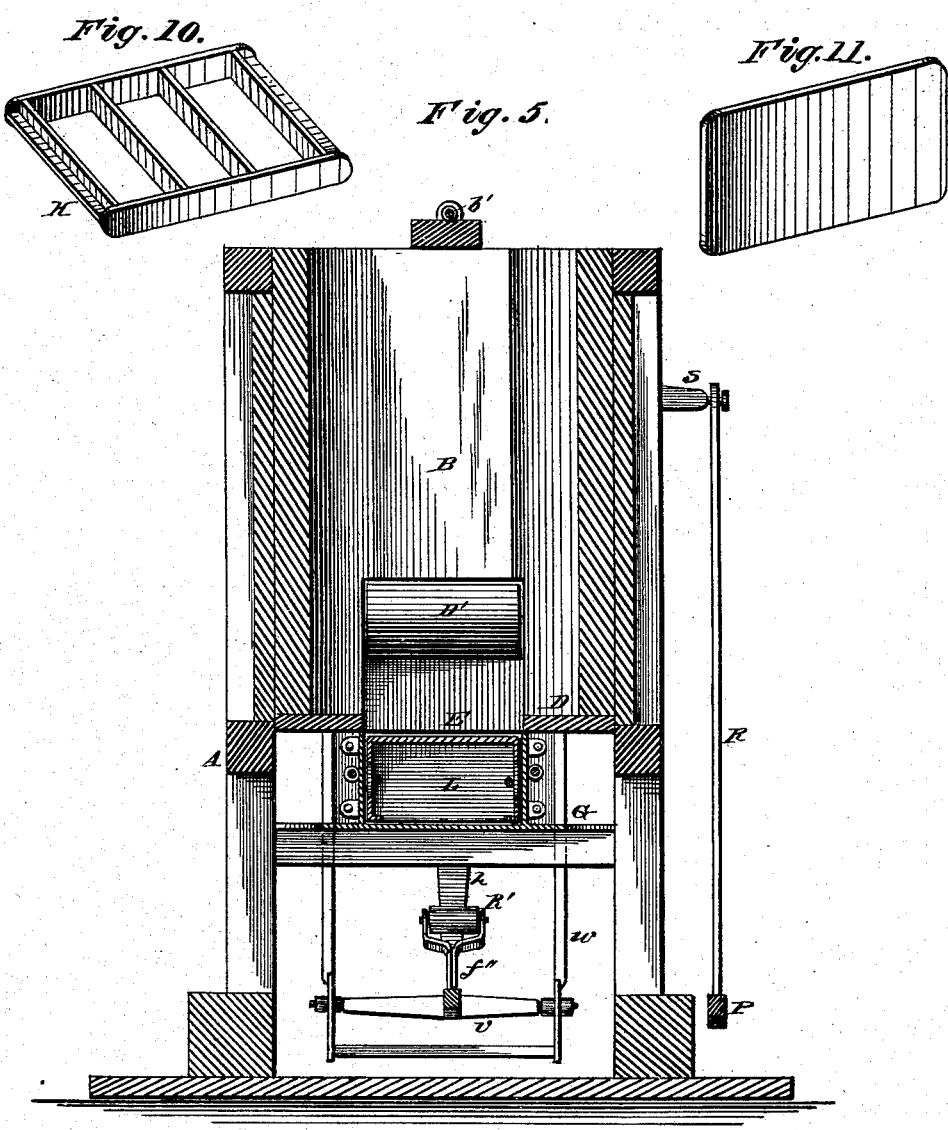

UNITED STATES PATENT OFFICE.

JAMES C. CONROY, OF ALLEGHENY, AND HENRY D. KILGORE, OF PITTSBURG, PENNSYLVANIA.

BRICK-MACHINE.

SPECIFICATION forming part of Letters Patent No. 261,911, dated August 1, 1882.

Application filed June 28, 1881. (No model.)

*To all whom it may concern:*

Be it known that we, JAMES C. CONROY, of Allegheny, and HENRY D. KILGORE, of Pittsburg, in the county of Allegheny and State of Pennsylvania, have invented a new and useful Improvement in Brick-Machines; and we do hereby declare that the following is a full and exact description thereof, reference being had to the accompanying drawings, and to the letters of reference marked thereon.

Our invention relates to an improvement in brick-machines; and it consists of a clay-mill furnished with mixing-arms, sweep, plungers, and flexible receiving-chamber into which move independent plungers, and a holding and placing mechanism for the brick-molds, and a cutting device for cutting the clay off the outer face of the receivers, the several parts operating with relation to each other in the manner and by the means hereinafter described.

To enable others skilled in the art with which our invention is most nearly connected to make and use it, we will proceed to describe its construction and operation.

Figure 1:
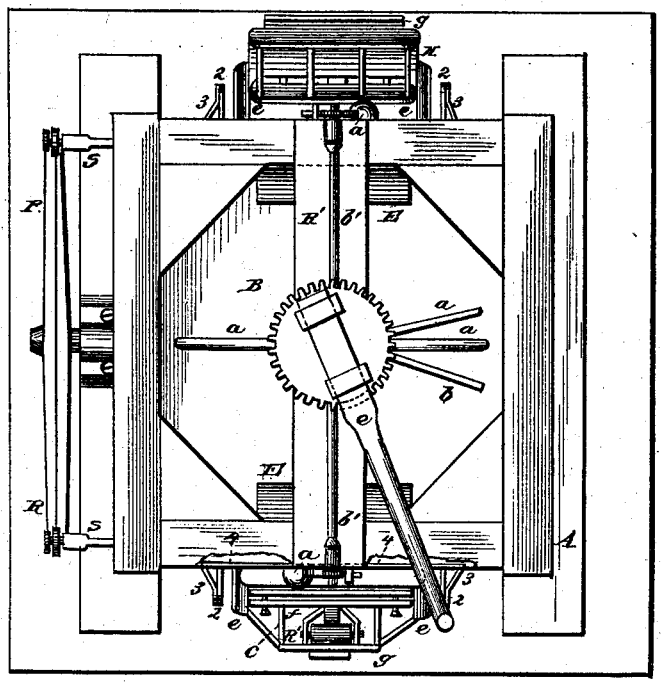
Figures 6, 7:
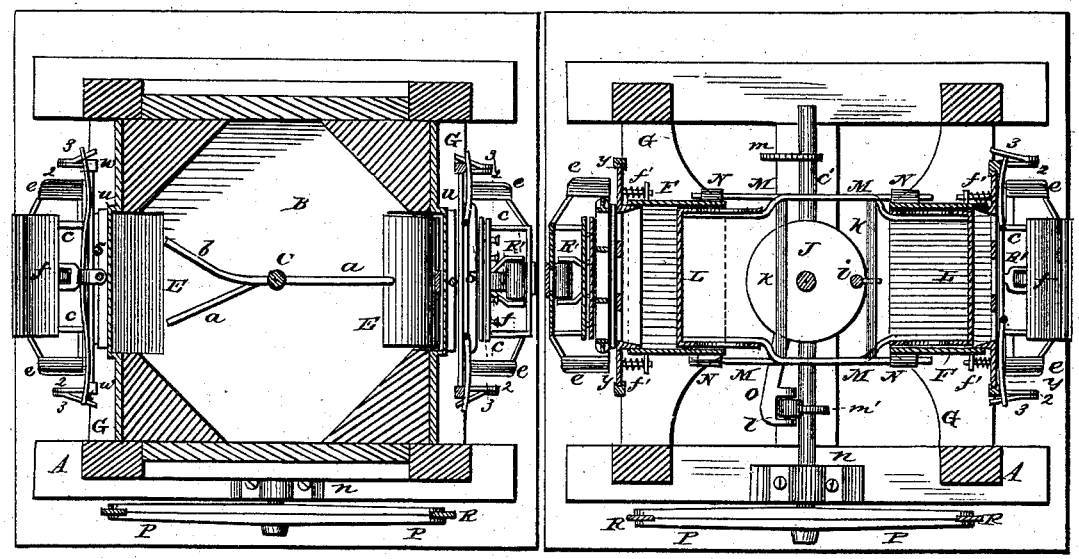
Figure 3:
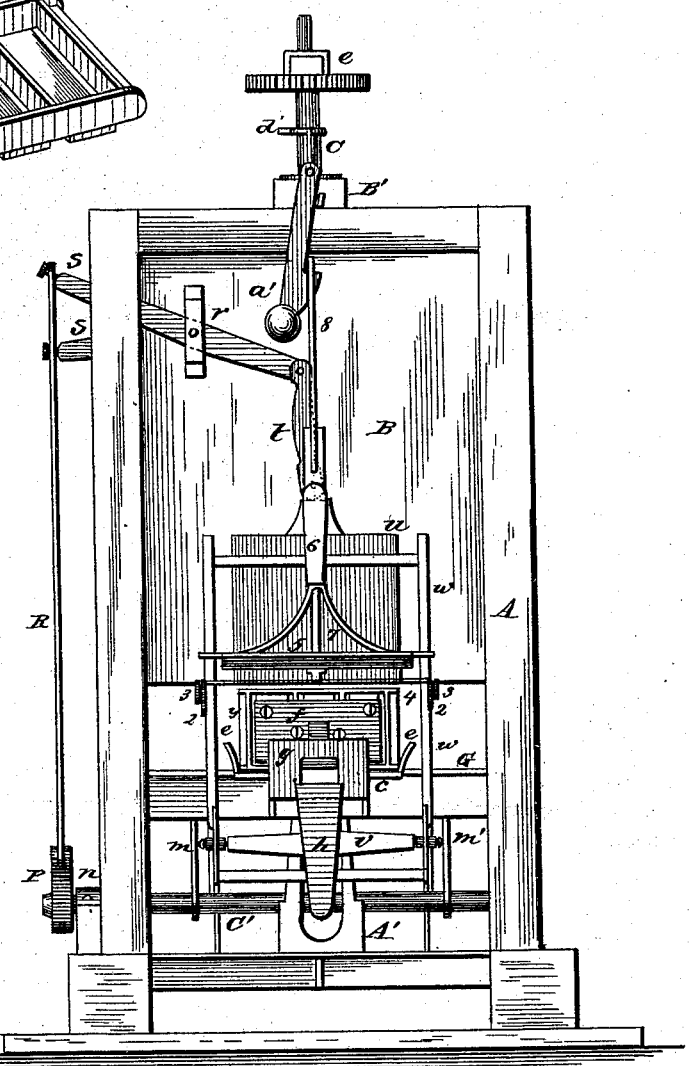
Figure 4:
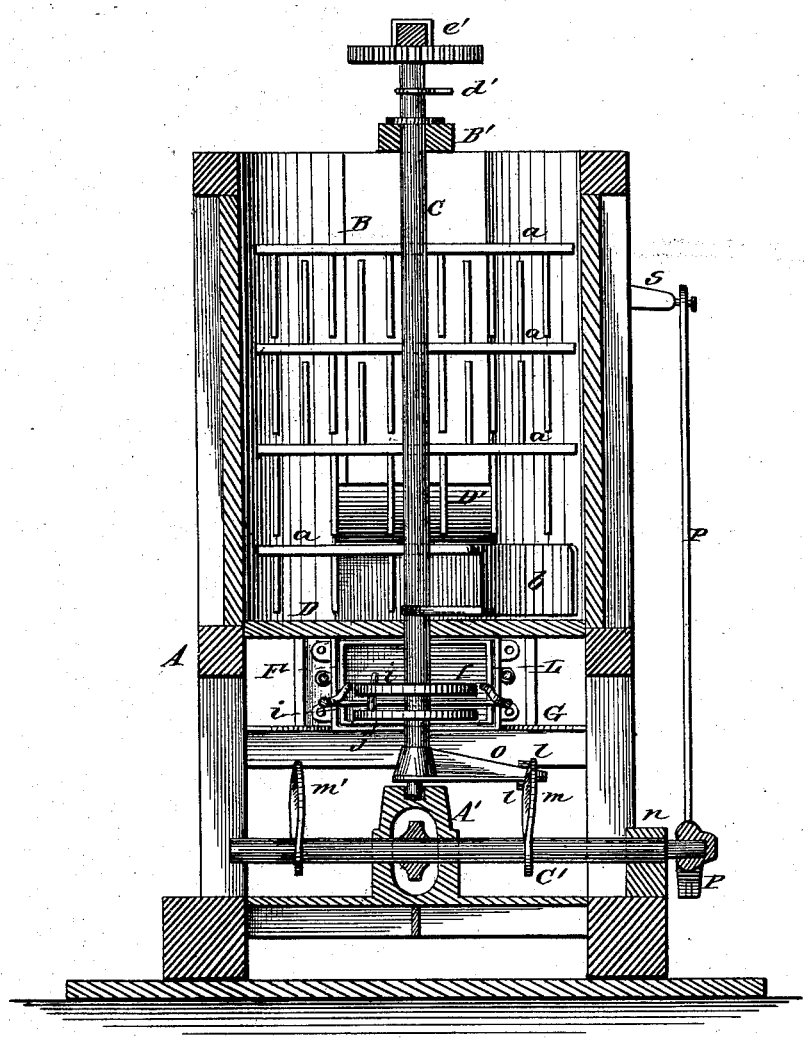

In the accompanying drawings, which form part of our specification, Figure 1 is a top view or plan of our improvement in brick-machines. Fig. 2 is a side elevation of the same. Fig. 3 is an end elevation of the same. Fig. 4 is a vertical section at line *y* of Fig. 2. Fig. 5 is a vertical section at line *x* of Fig. 2. Fig. 6 is a horizontal section at line *y'* of Fig. 2. Fig. 7 is a horizontal section at *x'* of Fig. 2. Figs. 8, 9, 10, and 11 are detail views.

Figure 8:
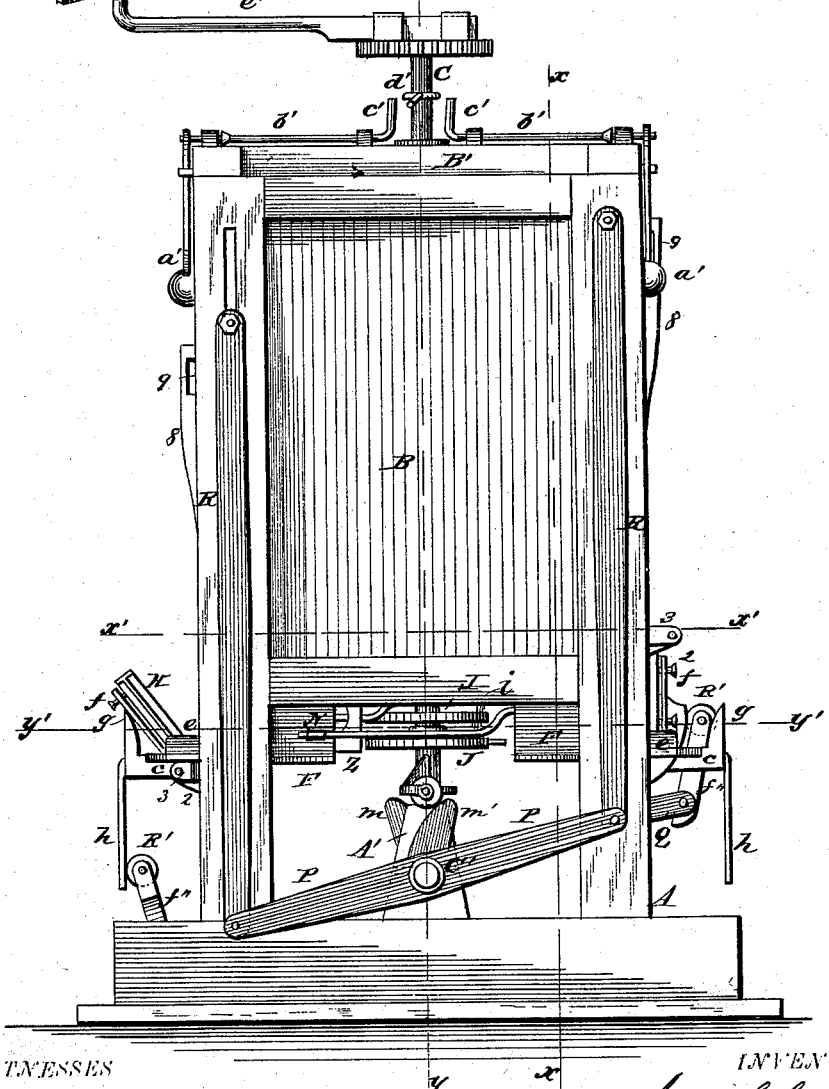
Figure 9:
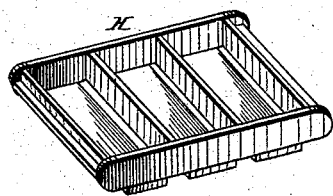

Reference being had to the accompanying drawings, A represents the frame of the machine, and B represents the clay-mill, in the axis of which is a shaft, C, which is supported at its lower end in a pedestal, A', and supported near its upper end by a bearing in the bar B', said shaft having thereon mixing-arms *a* and a sweep, *b*, all arranged above the bottom D of said mill. In said bottom are two openings, E, which communicate with clay-receivers F, which are so constructed and arranged that their front face, *y*, will yield to any undue pressure of the molds against the face of said receivers, which receivers are supported upon the bars G, which also support the rests *c* and guides *e* for the brick-molds H and their pivoted pressure-aprons *f*, which are held from falling beyond the desired point by a projection, *g*, on the front end of the rest *c*, below which projection is a pendant, *h*, for guiding the pressure-rollers R', which operate the pressure-apron *f*. The flexibility or yielding of the face-plate *y* to undue pressure may be secured by the employment of spiral springs, as shown in Figs. 7 and 8, at *f'*, or by other means which will readily suggest themselves to the mind of the skillful mechanic. By this flexible feature of the face-plate *y* all liability to breakage of the machine through undue pressure is avoided and the several parts in the machine relieved from undue frictional action in their operation.

On the shaft C, below the bottom D of the mill B, are two disks, I and J, having adjustable pins *i*, which act against bars K, Fig. 7, which are adjustable for regulating the travel of the plungers L, which move in the receivers F, and are guided in a horizontal plane by means of the bars M, which move in guides N on the sides of the receivers F, said plungers L operating independently of each other through the medium of the disks I and J and pins *i*, furnished with rollers.

Below the disks J, on the shaft C, is an arm, O, having at its outer end a friction-roller, *l*, which operates against arms *m* and *m'*, projecting at right angle to the axis of the shaft C', which shaft passes through the pedestal A' and has bearings therein, and has also a bearing at *n* on the frame A. On the shaft C' are rocking arms P and Q. To the outer ends of the rocking arm Q are pivoted arms *f''* in the upper end of which are pressure-rollers R'. To the ends of the rocking arm P are pivoted connecting-rods R, the upper ends of which are connected to the end of levers S, which are pivoted at *r*, and to the inner end of which are attached rods *t*, attached to vertical-moving plungers D', which move in guides *u*. Near the ends of the rocking arms Q project at right angle to them arms *v*, the ends of which project through slots in the side bars of the frame *w*, which side bars are grooved on their inner edge, into which grooves the end edges of the flexible face-piece *y* of the clay-receivers F are fitted and serve as a guide for the frame *w*, from which project arms 2, having on their outer sides springs 3, to which is attached a wire, 4, for cutting and thereby separating the clay in the brick-mold from the clay in the receivers F. By this arrangement of the frame *w*, its arms 2, springs 3, and wire 4 with relation to the flexible face *y* the wire 4 and frame *w* will always hold the same relation to each other, notwithstanding any movement that may occur in the flexible face-piece *y*.

Above the arms 2 of the frame *w* is arranged a knife, 5, which is attached to a slide, 6, which moves on a rod, 7, from which slide projects an arm, 8, having a slot, 9, therein, into which catches a weighted latch, *a'*, which is attached to a rod, *b'*, pivoted in suitable bearings on the bar B', the inner end of said rod having a vertical projection, *c'*, against which acts a pin, *d'*, projecting from the vertical shaft C for the purpose of unshipping the weighted latch *a'*, which drops into the slot 9 of the arm 8, when the knife 5 is carried up by the arms 2 of the frame *w*.

The brick-molds H are of ordinary construction, and may have their bottom board attached or detached, as may be elected by the brick-manufacturer.

All things being constructed and arranged relatively to each other, as hereinbefore described, and represented in the accompanying drawings, clay suitably moistened is thrown into the mill B. The shaft C is revolved through the medium of the sweep-lever *e'* or by suitable gearing, thereby causing the mixing-arms *a* to temper the clay and the sweep *b* to force the mixed clay under the plunger D'. The arm O, acting against the arm *m*, projecting at right angle to the axis of the shaft C', will at proper intervals impart motion to the rocking arm P, and thereby, through the medium of the connecting-rod R, lever *s*, and rod *t*, so operate the plunger D' that it will force the mixed clay down into the receivers F and hold it therein until the plungers L force the clay out of the receivers F into the brick-molds, which are held in position by means of the pressure-rollers R' and apron *f*. The arm O then acts against the arm *m'*, which will cause the pressure-rollers R' and frame *w* to descend, causing the wire 4 to cut and separate the clay in the brick-mold from the clay in the receiver, at which point there is a short interval in the movements of the rocking arms P and Q, giving time for the removal of the brick-mold and the placing in of another mold; but prior to placing in of the empty mold the pin *d'* strikes against the projection *c'* of the rod *b'*, and thereby unships the latch *a'*, which allows the knife 5 to sweep down over the flexible front face, *y*, and clean therefrom any clay or other matter that would prevent the proper fitting of the brick-mold against said face, and is then carried back by the frame *w*, after which the brick-mold is placed in position against the flexible face-piece *y*. As the frame *w* and pressure-rollers R' commence descending the plunger D' commences ascending, and after a short interval the plungers L are moved back in the clay-receivers F, which are then ready for receiving a fresh charge of mixed clay.

We have described the arrangement of plungers, receiver, cleaning-knife, cutting-wire, pressure-apron, pressure-roller, rest for the brick-mold, and operating mechanism for one end of the machine; but this arrangement of parts is duplicated and arranged at each end of the machine, and operates alternately, and may be disconnected in such manner that the said parts at one end of the machine may be at rest while the other is operative.

Having thus described our improvement in brick-machines, what we claim is—

1. In a brick-machine, the clay-receiver F, having a yielding face-piece, *y*, substantially as herein described, and for the purpose set forth.

2. In a brick-machine, the mold-rest *c*, having guides *e*, pressure-apron *f*, projection *g*, and pendant *h*, in combination with the pressure-rollers R' and flexible face-piece *y* of the receivers F, substantially as herein described, and for the purpose set forth.

3. In a brick-machine, the combination, with the clay-receivers F F and disconnected plungers L L, of the revolving disks I J, having adjustable pins *l*, and arranged intermediate of and operating said plungers substantially in the manner as and for the purpose herein shown and described.

4. In a brick-machine, the frame *w*, having arms 2, springs 3, and cutting-wire 4, in combination with the flexible face-piece *y*, knife 5, and operating mechanism, substantially as herein described, and for the purpose set forth.

5. In a brick-machine, the combination of the knife 5, weighted latch *a'*, and operating mechanism, substantially as herein described, and for the purpose set forth.

6. In a brick-machine, the combination of the arm O on shaft C and arms *m m'* on shaft C' for operating the arms P and Q, substantially as herein described, and for the purpose set forth.

JAMES C. CONROY.
HENRY D. KILGORE.

Witnesses:
A. C. JOHNSTON,
J. J. JOHNSTON.